Sept. 15, 1970 A. B. FUNK ET AL 3,528,797
CHEMICAL SUPPRESSION OF NITROGEN OXIDES
Filed Nov. 8, 1967
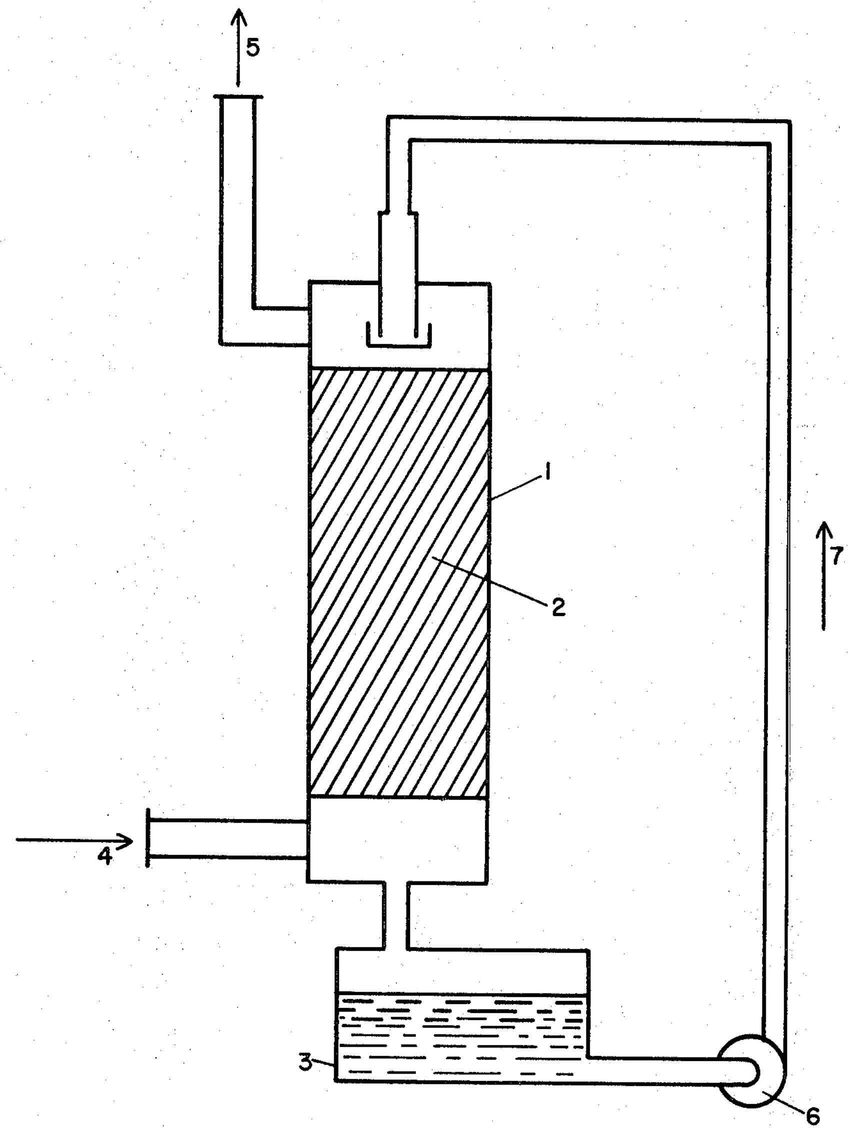
INVENTORS
JAMES C. MOORE
ANDREW B. FUNK 3,528,797
CHEMICAL SUPPRESSION OF NITROGEN OXIDES Andrew B. Funk and James C. Moore, Memphis, Tenn., assignors to W. R. Grace & Co., New York, N.Y., a corporation of Connecticut Filed Nov. 8, 1967, Ser. No. 681,313
Int. Cl. C05b *11/06*
U.S. Cl. 71—39 6 Claims

ABSTRACT OF THE DISCLOSURE

Suppression of evolution of nitrogen oxides resulting from the acidulation of phosphate rock with nitric acid is accomplished by use of urea either in a scrubbing system or by direct addition of urea to the acidulation mixture.

This invention relates to a process for the suppression of nitrogen oxides which are formed as by-products of the phosphate fertilizer manufacturing process. In a particular embodiment of this invention, a scrubbing apparatus containing urea is provided which substantially eliminates all nitrogen oxides from the exhaust gas flow. In another embodiment of the invention, urea is added directly to the phosphate acidulation reaction vessel to prevent nitrogen oxides from being evolved.

In order to fully appreciate this invention, a short discussion of the phosphate fertilizer process will be valuable. In the production of phosphate fertilizer as practiced in the U.S., mineral acids such as sulfuric, phosphoric, or combinations of these acids are the major acidulating agents used for treatment of phosphate rock. In more recent times, nitric acid has been utilized for this purpose either as the sole agent or in combination with other mineral acids. The action of the acid agent(s) upon the phosphate rock results in the solubilization of the phosphate value with the simultaneous release of carbon dioxide (when uncalcined rock is utilized). In the case where nitric acid is a component of the acidulating medium, nitrogen oxides are also released.

It is the present practice in the art to pass these fumes through a limestone packed scrubber, countercurrent to a flow of water. This system has proved to be inadequate inasmuch as the major portion of the nitrogen oxide fumes pass directly through the scrubber to the atmosphere.

Several alternate fume removal units have been tested on a commercial scale but none can guarantee complete removal of the nitrogen oxide fumes.

We have now determined that the use of urea will effectively remove or prevent formation of a major portion of the nitrogen oxides. In the majority of commercial operation cases, virtually 100% of the nitrogen oxides are removed from the stack gases before they are vented.

The nitrogen oxide gases referred to above result from the dissociation of nitric acid when it functions as an oxidizing agent according to the following equations:

$$2HNO_3 \rightarrow H_2O + 2NO_2 + \frac{1}{2}O_2$$
(high temperature concentrated acid)
$$2HNO_3 \rightarrow H_2O + 2NO + 1\frac{1}{2}O_2$$
(low temperature dilute acid)

We have found that urea when dissolved in water reacts with nitrogen oxide and nitrogen dioxide gases to produce nitrogen, carbon dioxide, and water. Although we do not wish to be bound by theory, the reaction mechanism apparently is based on the formation of nitrogen dioxide, absorption of the nitrogen oxides in water to form nitrous and nitric acids and finally the reaction of nitrous acid and urea. Any nitric oxide formed is oxidized to nitrogen dioxide and subsequently converted to nitrous acid.

We found this reaction mechanism takes place when nitrogen dioxide fumes are passed through a urea-nitric acid-water solution. When urea is not present, the nitrous acid immediately decomposes to nitrogen oxides. With urea present, however, the nitrous acid and urea react forming nitrogen, carbon dioxide, and water, as shown by the following equation:

$$2HNO_2 + NH_2CONH_2 \rightarrow 2N_2 + CO_2 + 3H_2O$$

The above discussion, it must be remembered, is a theoretical one. We have found that in the fertilizer process, the number of moles of urea required to suppress emission of the nitrogen oxides is dependent not only upon the theoretical stoichiometric quantities but also on other factors. Some of these factors are composition of phosphate rock, rate of evolution of nitrogen oxide, intensity of agitation, and retention time of gases in the liquid phase. In addition, we have found a variance in the amount of urea required when all the $P_2O_5$ value is derived from phosphate rock as opposed to when a portion of the $P_2O_5$ is derived from phosphate rock (the balance being supplied by other phosphate sources).

However, generally we can use 0.1–0.5% by weight urea, based on the total weight of the batch size of the fertilizer product. In other words, if a finished batch size of 5 tons is being prepared, 10–50 pounds of urea can be added to the acidulation mixture. The preferable range of urea is 0.1–0.3 weight percent, based on the total weight of the batch size.

It is, therefore, an object of this invention to provide a means for controlling the emission of nitrogen oxide fumes from phosphate rock acidulation.

It is another object of our invention to prevent emission of nitrogen oxide gases by adding urea to the phosphate rock mass as it is acidulated.

It is still another object of this invention to provide a method of preventing emission of nitrogen oxide fumes by providing a scrubbing process containing urea and water through which stack gases are vented.

In summary, this invention comprises using urea to control and/or prevent emission of nitrogen oxide gases from the phosphate rock acidulation process. The urea may be employed in an aqueous scrubbing tower or it may be added to the acidulation mass.

It is clear that urea can be used as a nitrogen oxide suppressant when other acids in addition to the nitric acid are used in the acidulating medium. We have provided examples which use $HNO_3$ and $H_2SO_4$; $HNO_3$, $H_3SO_4$. However, urea can be used if $HNO_3$ is the sole acid used.

In order to more fully understand the numerous embodiments of this invention, the following examples are provided.

EXAMPLES 1–6

The first six examples provide a clear demonstration of the efficacy of using urea as a nitrogen oxide suppressant. In these examples, the urea was added directly to the acidulation mass. Generally, the procedure used was to place the nitric acid in the reacting tank, then add urea, and then add the rock incrementally with stirring, to insure complete reaction. The results of each example are tabulated separately. Examples 1, 2, and 3 provide 15 tons of Grade 9–9–9 fertilizer. Example 1 was the control to which no urea was added. Examples 2 and 3 contained 100 and 50 pounds of urea, respectively. Examples 4, 5, and 6 provided 15 tons of Grade 6–12–18 fertilizer. Example 4 had no urea added and 100 and 50 pounds of urea were added to Examples 5 and 6, respectively.

It is believed Examples 1–6 are self-explanatory with the exception of the nitrogen dioxide fume rating column. The evaluation of the effect of urea was based on the following empirical observations of the fumes leaving the fume stack. "None" or "nil" means that no $NO_2$ fumes were observed. "Trace" means $NO_2$ fumes were observed which dissipated within 10 yards from the point of emission to the atmosphere. "Medium" means $NO_2$ fumes were observed which did not dissipate for 50 yards. "Heavy" means $NO_2$ fumes were observed which did not dissipate for 100 yards.

EXAMPLE 1

Grade: 9–9–9
Batch size: 15 tons
Weight urea: 0 lbs.

| Time (min.) | Raw material | Lbs. raw material | Nitrogen dioxide fume fume rating | Remarks |
|---|---|---|---|---|
| 6 | $HNO_3$ | 12,190 | Heavy | |
| 7 | Rock | 720 | do | |
| 8 | do | 800 | do | |
| 9 | do | 450 | do | |
| 10 | do | 425 | do | |
| 11 | do | 850 | do | |
| 12 | do | 950 | do | |
| 13 | do | 550 | do | |
| 14 | do | 350 | do | |
| 15 | do | 800 | do | |
| 16 | do | 900 | do | |
| 17 | do | 625 | do | |
| 17½ | do | 400 | do | Rock addition complete 7,920 lbs. total. |
| 18½ | $H_2SO_4$ | 990 | do | |
| 28 | $H_2O$ | 4,010 | Nil | |

The acidulate was then ammoniated with anhydrous ammonia to an essentially neutral pH at which time muriate of potash and water required to yield the desired batch analysis and weight were added. During these operations, there was no visible discharge of nitrogen dioxide fumes.

EXAMPLE 2

Grade: 9–9–9
Batch size: 15 tons
Weight urea: 100 lbs.

| Time (min.) | Raw material | Lbs. raw material | Nitrogen dioxide fume fume rating | Remarks |
|---|---|---|---|---|
| 5 | $HNO_3$ | 12,190 | Heavy | |
| 6 | Urea | 100 | Nil | White fumes. |
| 7 | Rock | 510 | Nil | |
| 8 | do | 525 | Nil | |
| 9 | do | 1,000 | Nil | |
| 10 | do | 1,000 | Nil | |
| 11 | do | 950 | Trace | |
| 12 | do | 850 | do | |
| 13 | do | 875 | do | |
| 14 | do | 925 | do | |
| 15 | do | 1,175 | Nil | |
| 15½ | do | 350 | Nil | Rock addition complete 7,910 lbs. total. |
| 17½ | $H_2SO_4$ | 990 | Trace | |
| 28 | $H_2O$ | 4,010 | Nil | |

The acidulate was then ammoniated with anhydrous ammonia to an essentially neutral pH at which time muriate of potash and water required to yield the desired batch analysis and weight were added. During these operations, there was no visible discharge or nitrogen dioxide fumes.

EXAMPLE 3

Grade: 9–9–9
Batch size: 15 tons
Weight urea: 50 lbs.

| Time (min.) | Raw material | Lbs. raw material | Nitrogen dioxide fume fume rating | Remarks |
|---|---|---|---|---|
| 3 | $HNO_3$ | 12,190 | Heavy | |
| 4 | Urea | 50 | Nil | White fumes. |
| 5 | Rock | 735 | Trace | |
| 6 | do | 850 | do | |
| 7 | do | 1,050 | do | |
| 8 | do | 1,050 | do | |
| 9 | do | 625 | do | |
| 10 | do | 975 | do | |
| 11 | do | 875 | do | |
| 12 | do | 975 | do | |
| 12¾ | do | 775 | do | Rock addition complete 7,910 lbs. total. |
| 14¼ | $H_2SO_4$ | 990 | Medium | |
| 15 | | | Heavy | |
| 25 | $H_2O$ | 4,010 | Nil | |

The acidulate was then ammoniated with anhydrous ammonia to an essentially neutral pH at which time muriate of potash and water required to yield the desired batch analysis and weight were added. During these operations, there was no visible discharge of nitrogen dioxide fumes.

EXAMPLE 4

GRADE: 6–12–18
BATCH SIZE: 15 TONS
WEIGHT UREA: 0 LBS.

| Time (min.) | Raw material | Lbs. raw material | Nitrogen dioxide fume rating | Remarks |
|---|---|---|---|---|
| 3 | $H_2O$ | 4,000 | | |
| 5 | $HNO_3$ | 7,360 | Medium | |
| 11 | $H_3PO_4$ | 5,840 | Nil | White Fumes. |
| 12 | $H_2SO_4$ | 1,030 | Nil | Do. |
| 13 | Rock | 370 | Trace | |
| 14 | do | 350 | do | |
| 15 | do | 400 | Medium | |
| 16 | do | 1,025 | do | |
| 17 | do | 1,125 | Heavy | |
| 18 | do | 1,000 | do | |
| 19 | do | 900 | do | |
| 20 | do | 1,050 | do | |
| 21 | do | 700 | do | Rock addition complete 6,920 lbs. total. |
| 31 | $H_2O$ | 1,600 | Nil | |

The acidulate was then ammoniated with anhydrous ammonia to an essentially neutral pH at which time muriate of potash and water required to yield the desired batch analysis and weight were added. During these operations, there was no visible discharge of nitrogen dioxide fumes.

EXAMPLE 5

GRADE: 6–12–18
BATCH SIZE: 22 TONS
WEIGHT UREA: 50 LBS.

| Time (min.) | Raw material | Lbs. raw material | Nitrogen dioxide fume rating | Remarks |
|---|---|---|---|---|
| 3 | $H_2O$ | 4,000 | | |
| 6 | $HNO_3$ | 7,360 | Medium | |
| 11 | $H_3PO_4$ | 5,840 | Nil | White Fumes. |
| 13 | $H_2SO_4$ | 1,030 | Nil | Do. |
| 14 | Urea | 50 | Nil | Do. |
| 15 | Rock | 845 | Nil | |
| 16 | do | 925 | Trace | |
| 17 | do | 800 | Medium | |
| 18 | do | 900 | do | |
| 19 | do | 825 | do | |
| 20 | do | 0 | Trace | Rock off because of high foam level. |
| 21 | do | 945 | do | |
| 22 | do | 730 | do | |
| 23 | do | 325 | do | |
| 24 | do | 625 | do | Rock addition completed 6,920 lbs. added. |
| 34 | $H_2O$ | 1,600 | Nil | |

The acidulate was then ammoniated with anhydrous ammonia to an essentially neutral pH at which time muriate of potash and water required to yield the desired batch analysis and weight were added. During these operations, there was no visible discharge of nitrogen dioxide fumes.

EXAMPLE 6

GRADE: 6-12-12
BATCH SIZE: 22 TONS
WEIGHT UREA: 100 LBS.

| Time (min.) | Raw material | Lbs. raw material | Nitrogen dioxide fume rating | Remarks |
|---|---|---|---|---|
| 4 | $H_2O$ | 4,000 | | |
| 5 | Urea | 100 | | |
| 19 | $HNO_3$ | 7,360 | Nil | White Fumes. |
| 28 | $H_3PO_4$ | 5,840 | Nil | Do. |
| 29 | $H_2SO_4$ | 1,030 | Nil | Do. |
| 30 | Rock | 870 | Nil | |
| 31 | do | 950 | Trace | |
| 32 | do | 950 | do | |
| 33 | do | 1,000 | do | |
| 34 | do | 870 | Nil | |
| 35 | do | 780 | Nil | |
| 36 | do | 1,000 | Nil | |
| 36½ | do | 500 | Nil | Rock addition complete 6,920 lbs. added. |
| 47 | $H_2O$ | 1,600 | Nil | |

The acidulate was then ammoniated with anhydrous ammonia to an essentially neutral pH at which time muriate of potash and water required to yield the desired batch analysis and weight were added. During these operations, there was no visible discharge of nitrogen dioxide fumes.

EXAMPLES 7–14

The following examples were laboratory batch runs using the same ratios of reactants and the same general process conditions as in Examples 1–6 except that quantitative measurement of $NO_2$ evolution was taken. The total gases evolved from the reactor were scrubbed through a solution of hydrogen peroxide (6%) to convert nitrogen oxides to nitric acid. Upon completion of gas adsorption, this solution was titrated with a standard base and the amount of adsorbed nitric acid calculated. Using this value, it was then possible to calculate the amount of nitrogen oxides (as nitrogen dioxide) evolved. Results of the example are tabulated below.

It is noted that Examples 10, 11, and 14 are control examples to which no urea is added. A considerable increase in weight of $NO_2$ evolution is noted in these examples.

EXAMPLE 7

Grade: 8.8–17.6–0
Batch size: 6,000 g.
Weight urea: 2.5 g.

| Time (min.) | Raw material | G. raw material | Total $NO_2$ evolution in g. |
|---|---|---|---|
| 1 | $H_2O$ | 800 | |
| 2 | $HNO_3$ | 1,472 | |
| 3 | Urea | 2.5 | |
| 4 | $H_3PO_4$ | 1,168 | |
| 5 | $H_2SO_4$ | 206 | |
| 14.5 | Rock | 1,428 | |
| 15.0 | $H_2O$ | 320 | |
| 24.5 | | | 0.49 |

EXAMPLE 8

Grade: 8.8–17.6–0
Batch size: 6,000 g.
Weight urea: 5 g.

| Time (min.) | Raw material | G. raw material | Total $NO_2$ evolu.-tion in g. |
|---|---|---|---|
| 1 | $H_2O$ | 800 | |
| 2 | $HNO_3$ | 1,472 | |
| 3 | Urea | 5 | |
| 4 | $H_3PO_4$ | 1,168 | |
| 5 | $H_2SO_4$ | 206 | |
| 15 | Rock | 1,428 | |
| 15.5 | $H_2O$ | 320 | |
| 25 | | | 0.15 |

EXAMPLE 9

Grade: 14–7–7
Batch size: 6,000 g.
Weight urea: 8 g.

| Time (min.) | Raw material | G. raw material | Total $NO_2$ evolution in g. |
|---|---|---|---|
| 1 | $HNO_3$ | 3,634 | |
| 2 | Urea | 8 | |
| 10 | Rock | 1,244 | |
| 12 | $H_2SO_4$ | 132 | |
| 22 | | | 0.30 |

EXAMPLE 10

Grade: 8.8–17.6–0
Batch size: 6,000 g.
Weight urea: 0 g.

| Time (min.) | Raw material | G. raw material | Total $NO_2$ evolution in g. |
|---|---|---|---|
| 1 | $H_2O$ | 800 | |
| 2 | $HNO_3$ | 1,472 | |
| 3 | $H_3PO_4$ | 1,168 | |
| 4 | $H_2SO_4$ | 206 | |
| 13.5 | Rock | 1,428 | |
| 14.5 | $H_2O$ | 320 | |
| 23.5 | | | 1.77 |

EXAMPLE 11

Grade: 9–9–9
Batch size: 6,000 g.
Weight urea: 0 g.

| Time (min.) | Raw material | G. raw material | Total $NO_2$ evolution in g. |
|---|---|---|---|
| 1 | $HNO_3$ | 2,483 | |
| 10 | Rock | 1,640 | |
| 11 | $H_2SO_4$ | 198 | |
| 12 | $H_2O$ | 810 | 4.33 |
| 21 | | | |

EXAMPLE 12

Grade: 9–9–9
Batch size: 6,000 g.
Weight urea: 6 g.

| Time (min.) | Raw material | G. raw material | Total $NO_2$ evolution in g. |
|---|---|---|---|
| 1 | $HNO_3$ | 2,483 | |
| 2 | Urea | 6 | |
| 12 | Rock | 1,640 | |
| 13 | $H_2SO_4$ | 198 | 0.81 |
| 13.5 | $H_2O$ | 810 | |
| 23 | | | |

EXAMPLE 13

Grade: 9–9–9
Batch size: 6,000 g.
Weight urea: 10 g.

| Time (min.) | Raw material | G. raw material | Total $NO_2$ evolution in g. |
|---|---|---|---|
| 1 | $HNO_3$ | 2,483 | |
| 2 | Urea | 10 | |
| 12.3 | Rock | 1,640 | |
| 13 | $H_2SO_4$ | 198 | |
| 13.4 | $H_2O$ | 810 | |
| 23 | | | 0.48 |

EXAMPLE 14

Grade: 14–7–7
Batch size: 6,000 g.
Weight urea: 0 g.

| Time (min.) | Raw material | G. raw material | Total $NO_2$ evolution in g. |
|---|---|---|---|
| 1 | $HNO_3$ | 3,634 | |
| 9 | Rock | 1,244 | |
| 10 | $H_2SO_4$ | 132 | |
| 20 | | | 2.85 |

EXAMPLE 15

This example illustrates an alternate preferred embodiment of our invention. Instead of adding urea to the acidulating mass, the urea may be employed in an exhaust gas scrubbing unit. First, phosphate rock is reacted with the acid following the usual procedures. The nitrogen oxide fumes which are evolved are collected and passed through a gas scrubbing unit countercurrent to a solution flow of urea, nitric acid and water. A diagrammatic sketch of the apparatus is provided in the drawing. This apparatus consists of a column 1 containing column packing indicated by the shaded lines 2. The scrubbing solution reservoir 3 is connected to a recirculating pump 6 whereby the solution can be pumped through pipe 7 to the top of column 1 and allowed to flow by gravity back into the reservoir. The exhaust gases containing nitrogen oxides enter into the column at 4. They pass up through the column countercurrent to the flow of scrubbing solution and out of the column at exit 5.

In a specific embodiment of the apparatus shown, a bench scale gas scrubber was fabricated from a 2 inch internal diameter Pyrex glass pipe. A packing height to diameter ratio of 2:1 was used. Berl saddles, ⅜ inch size, were used as packing. Nitrogen dioxide was metered through a flow meter from a bottle of pure gas, then diluted with air to yield a mixture containing 15% by weight $NO_2$ and 85% by weight air.

The scrubbing solution contained 10% by weight nitric acid and 10% by weight urea in solution with 80% by weight water. The solution was circulated by a pump driven by ½ horse power motor through a variable speed hydraulic transmission. The nitrogen dioxide stream was fed through the bottom of the column at a rate of approximately 1.5 grams per minute. At the same time the solution was circulated over the packing at a flow rate of 30 g. per minute from the reservoir containing 150 g. total. Visual inspection of the gases leaving the scrubber indicated complete removal of nitrogen dioxide fumes.

Generally, we prefer to use a 5–20% by weight of urea and a nitric acid in aqueous solution as the scrubbing solution. It is difficult to state the exact proportions, since the most efficient amount can be easily determined by actual experimentation. As has been stated earlier, the exact composition of the phosphate rock used will have a bearing on amounts of nitrogen oxides evolved.

EXAMPLE 16

Although previous examples have illustrated this invention using the nitrogen oxide fumes produced as a result of the acidulation of phosphate rock, it is clear that urea can be used to suppress nitrogen oxide fumes whenever the fumes are a problem. For instance, our inventive process could be valuably employed in any process which utilizes nitric acid with the attendant evolution of undesirable nitrogen oxide fumes.

To demonstrate this, separate portions of a gaseous stream composed of NO, $NO_2$, $CO_2$, air and $H_2O$ vapor was passed through gas scrubbing bottles equipped with a medium porosity but containing the following solutions or suspensions:

(A) $CaCo_3$ (½″ mesh size) in water
(B) $CaCo_3$ (finely ground reagent grade) in water
(C) NaOH (10% aqueous solution)
(D) $H_2SO_4$ (10% aqueous solution)
(E) $HNO_3$ (10% by weight in water)
(F) Urea (10% by weight in water).

Absorption efficiency was evaluated by visual observation of the color of gases leaving the scrubbers. In only case (F) did the exhaust gases exit the scrubber in a colorless state indicating essentially complete removal of oxides of nitrogen. In all other cases, the exhaust gases exhibited varying degrees of brown color indicating incomplete $NO_2$ absorption.

We claim:

1. In the process of acidulating phosphate rock, at least part of the acidulating medium being nitric acid, the improvement consisting of adding urea to the mixture of acidulating medium and phosphate rock and thereby substantially reducing the evolution of nitrogen oxides from said reaction mixture; the urea being in minor amount not exceeding 0.5% by weight, based on the total weight of the mixture.

2. The process according to claim 1 in which the urea is employed in 0.1–0.5% by weight.

3. In the process of acidulating phosphate rock, at least part of the acidulating medium being nitric acid, the improvement consisting of passing the gases produced in the acidulating process through a gas scrubbing apparatus providing a flow of a urea-nitric acid-water solution in contact with the exhaust gas flow, and in which both the urea and the nitric acid are a 5–20% by weight solution in the water.

4. A process for the suppression of nitrogen oxide fumes resulting from the use of nitric acid in an acidulating medium, which comprises treating the fumes evolved in a gas scrubbing apparatus by means providing a flow of a urea-nitric acid-water solution in contact with the exhaust gas flow, and in which both the urea and the nitric acid are a 5–20% by weight solution in the water.

5. A process for the suppression of nitrogen oxide fumes resulting from the use of nitric acid in an acidulating medium, which comprises adding urea to the reaction vessel; the urea being in minor amount not exceeding 0.5% by weight, based on the total weight of the acidulating mixture.

6. The process of claim 5 in which the urea is 0.1–0.5% by weight.

References Cited

UNITED STATES PATENTS 2,680,680 6/1954 Coleman ------------- 71—37
3,348,914 10/1967 Quanquin et al. ------ 23—161

REUBEN FRIEDMAN, Primary Examiner

C. N. HART, Assistant Examiner

U.S. Cl. X.R.

23—161